INVENTORS
James B. Babbitt
Clifford B. Harris
by their ATTORNEYS

Jan. 20, 1931.  J. B. BABBITT ET AL  1,789,857
BOTTLE CAPPING MACHINE
Filed Dec. 27, 1928    7 Sheets-Sheet 7

INVENTORS
James B. Babbitt
Clifford B. Harris
by Bros &c
their ATTORNEYS

Patented Jan. 20, 1931

1,789,857

UNITED STATES PATENT OFFICE

JAMES B. BABBITT, OF YONKERS, NEW YORK, AND CLIFFORD B. HARRIS, OF UNION CITY, NEW JERSEY, ASSIGNORS, BY MESNE ASSIGNMENTS, TO WALKER-GORDON LABORATORY COMPANY INC., OF PLAINSBORO, NEW JERSEY, A CORPORATION OF DELAWARE

BOTTLE-CAPPING MACHINE

Application filed December 27, 1928. Serial No. 328,720.

This invention relates to a bottle capping machine and contemplates an apparatus for applying sealing closures to milk bottles, and the like, by a drawing operation, as the bottles are fed to the machine.

It has for an object to provide such a machine in which the drawing operation for applying the cap or closure is accomplished by fluid actuated mechanism.

Another object consists in providing such a machine in which the mechanism for accomplishing the drawing operation includes an expansible and contractible device which is mechanically actuated by means under fluid control.

Another object consists in providing such a machine in which the mechanism for accomplishing the drawing operation includes a device which uninterruptedly engages the entire circumference of the cap or closure.

Another object consists in providing such a machine in which the mechanism for accomplishing the drawing operation includes a device that is mechanically actuated under fluid control in its operative movement and acts by its own resiliency in its return movement.

A further object consists in providing certain improvements in the form, construction and arrangement of the several parts whereby the above named and other objects may effectively be attained.

A practical embodiment of the invention is represented in the accompanying drawings, in which Fig. 1 represents a plan view of the machine, with the feeding belt and receiving table broken away;

The machine is designed to repeatedly and accurately act upon thin metallic caps or closures, that have previously been stamped to cup shape, so as to, by a drawing operation, closely and smoothly apply them to the necks of milk bottles and the like, in order to establish a tight and sightly sealing closure which must be destroyed in order to be removed, thereby tending to defeat counterfeiting or adulteration. Rapidity and accuracy of operation, without undue agitation of the bottles, are important considerations in devising such a machine for use in the milk industry, and they are able to be attained in the present apparatus.

Figure 6:
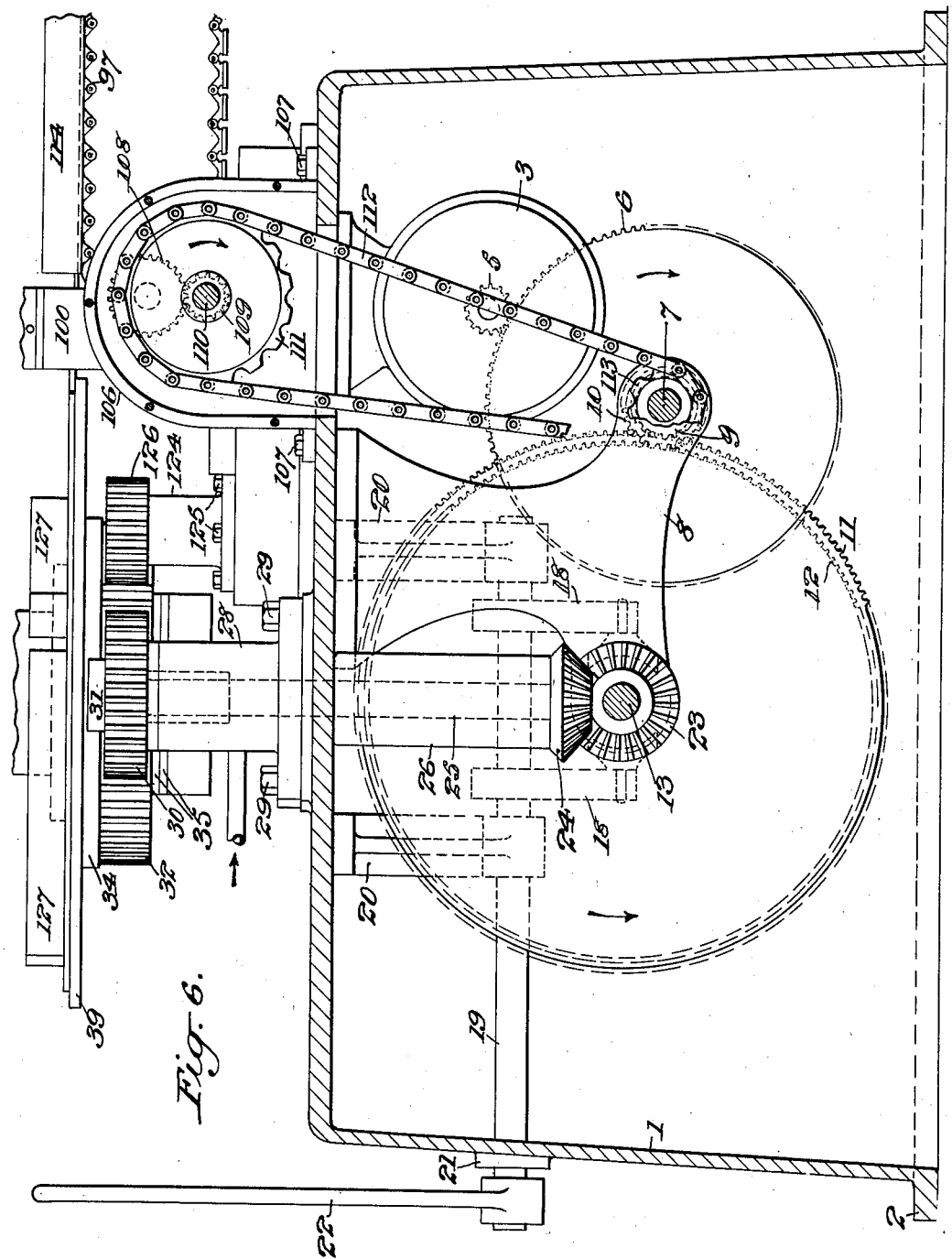
Fig. 6 represents a detail section taken in the plane of the line VI—VI of Fig. 3, looking in the direction of the arrows.
Figure 7:
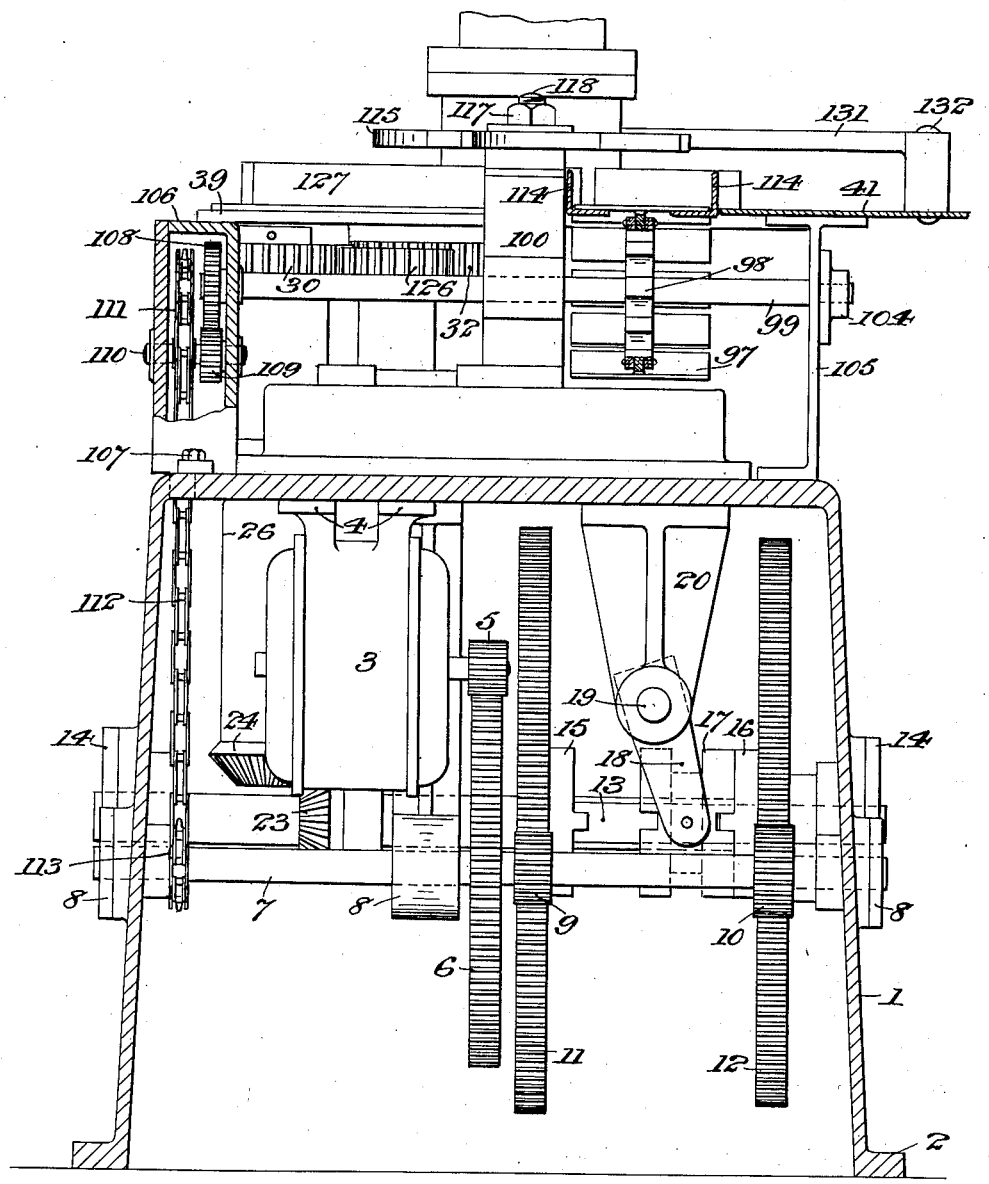
Fig. 7 represents a detail section taken in the plane of the line VII—VII of Fig. 3, looking in the direction of the arrows.
Figure 8:
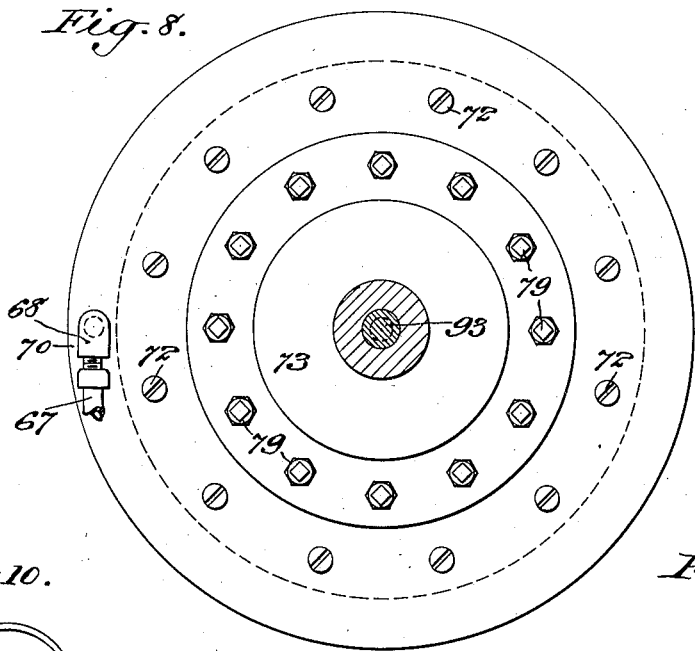
Fig. 8 represents an enlarged section taken in the plane of the line VIII—VIII of Fig. 5, looking in the direction of the arrows.

Referring to the drawings, and more particularly to Figs. 6 and 7, the machine includes a hollow housing 1 that may be composed of cast metal and is provided with flanges 2 for the reception of lag screws or the like to secure it to a suitable foundation.

A motor 3 is secured by brackets 4 to the under side of the top of housing 1 so as to be suspended therewithin. Its drive shaft has a pinion 5 fixed thereto, and the latter meshes with a gear 6 that is fast on a shaft 7 which is journaled in three bearings 8, two of which are mounted in the side of housing 1, while the third is in an intermediate hanger that depends from the top of the housing.

Said shaft also has pinions 9 and 10 fixed thereto, the latter being larger than the former; and said pinions mesh with gears 11 and 12, respectively, the former being larger than the latter. Gears 11 and 12 are freely mounted on shaft 13 which is journaled in bearings 14, carried in the sides of housing 1, and clutch members 15, 16, are formed integral with or secured to gears 11 and 12 respectively. A slidable clutch member 17 is keyed on shaft 13 and operable by arms 18 which are fixed on rod 19 that is journaled in two hangers 20, secured to the under side of the top of housing 1, and is also journaled in a bearing 21 mounted in the side of the housing. A handle 22 serves for manipulation of rod 19.

It will be seen that the structure above described provides for the power drive of shaft 13 at either of two speeds, at the election of the operator, by sliding clutch member 17 into engagement with member 15 or member 16. Engagement with member 16 provides the higher speed. This arrangement adapts the machine for cooperation with filling and feeding mechanism running at different speeds.

A bevel gear 23 is fixed on shaft 13 and meshes with a corresponding gear 24 that is fast on vertical shaft 25. The said shaft 25 pierces the top of housing 1 and a sleeve 26 surrounds the shaft and is located between gear 24 and the under side of the housing top, in order to properly locate gear 24 with respect to gear 23. The upper part of shaft 25 (see also Fig. 5) is fitted in bearing 27 that is set into a mounting 28 which is secured to the top of housing 1 by cap screws 29, and the extremity of the shaft has a gear 30 keyed thereto and a collar 31 pinned thereto, the latter serving to prevent downward movement of the shaft. It will be observed that bearing 27 is of such shape as to provide anti-friction contact for gear 31 as well as shaft 25.

The gear 30 meshes with a ring gear 32 that is fastened by cap screws 33 to a hub 34 which rides on bearing shims 35 that are fixed between the hub and an annular shelf formed on a tubular standard 36, which standard is fastened by cap screws 38 to the top of housing 1. An anti-friction bearing 37 is interposed between hub 34 and standard 36.

Figure 5:
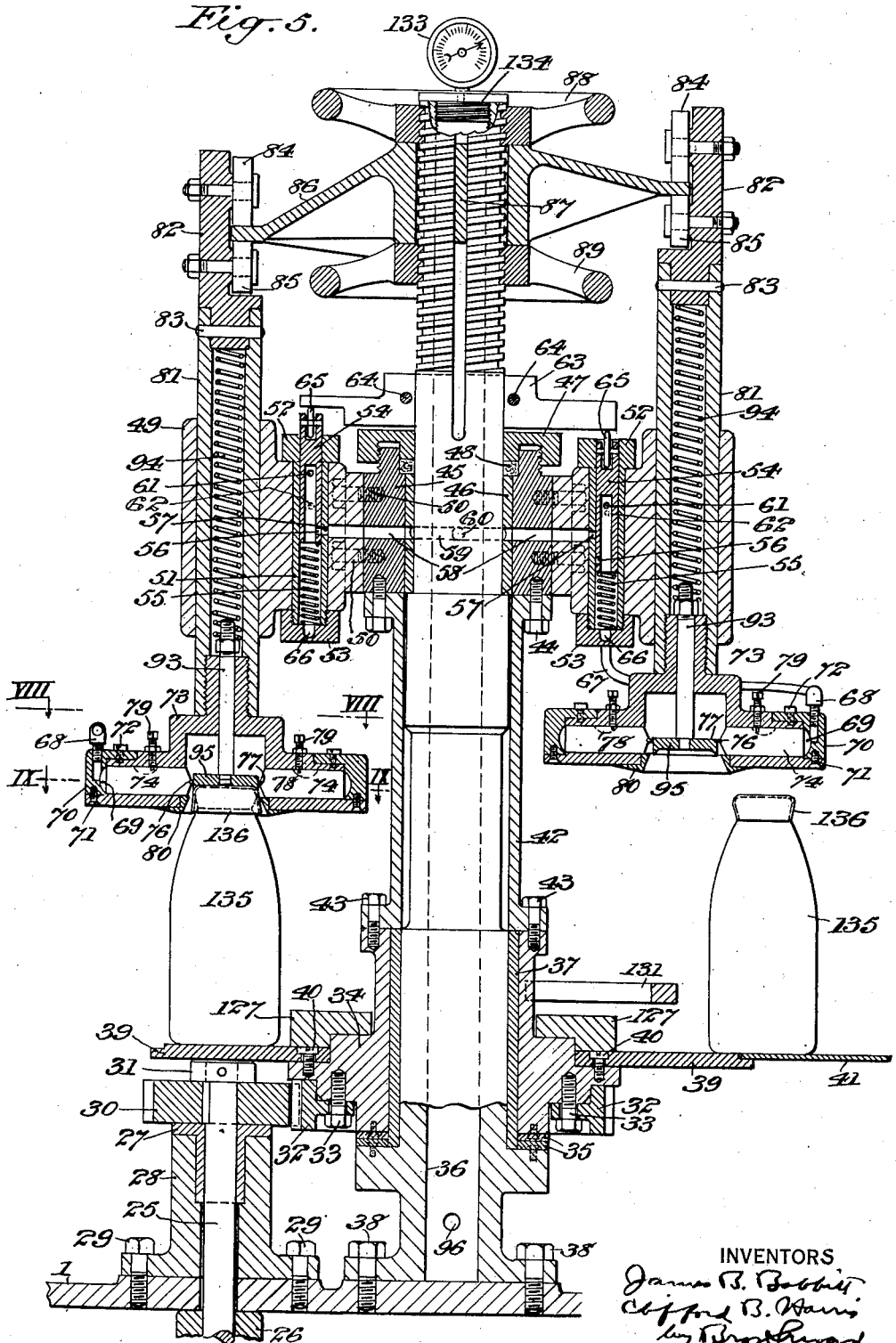
Fig. 5 represents a section taken in the plane of the line V—V of Fig. 1, looking in the direction of the arrows.

A flat circular bottle supporting ring 39 is secured by screws 40 to hub 34 so as to rotate therewith. The periphery of the said ring is rabbeted, as shown in Fig. 5, to accommodate the edge of table 41 that is set adjacent the machine for the purpose of receiving the capped bottles as they are discharged from the machine.

A tubular section 42 surrounds standard 36 and is fastened by screws 43 to the top of hub 34. Its upper end is fixed by screws 44 to a head 45 that is rotatably mounted on standard 36, through the intermediation of anti-friction bearing 46, which latter is supported in position by an enlarged portion of the standard. The upper portion of head 45 is threaded in order to receive a locking nut 47 that is arranged to clamp upon a washer 48 to produce a tight joint and prevent leakage of air from passages to be hereinafter described. It will be seen from the foregoing description that the rotation of hub 34 will correspondingly rotate head 45.

The said head carries four sets of capping mechanism, equally spaced thereabout and, as these are all alike, only one will be described.

The said mechanism includes a hollow bracket 49 that is fixed to head 45 by screws 50. A tube 51 is vertically mounted in a bore in bracket 49, and held in position by its head 52 and a nut 53 threaded on to the other end of the tube. A slide valve 54 is slidably mounted in tube 51, and yieldingly held in elevated position by expansion coil spring 55 that is housed in the tube. The said valve 54 has a port 56 which is designed to cooperate with a port 57 formed in tube 51, the latter port being in line with a radial passage 58 that opens into an annular groove 59 formed in the inside of bearing 46, and communicating with the interior of the standard through a duct 60.

In the light of this description, it will be observed that, when the ports 56 and 57 are in register, communication is opened between the interior of valve 54 and the interior of standard 36.

The slide valve 54 also has a port 61 that may slide into and out of alinement with port 62 that pierces the wall of tube 51 and the adjacent portion of bracket 49. When the ports 61 and 62 are in alinement the interior of valve 54 will be open to atmosphere for exhaust purposes to be hereinafter described.

The slide valve 54 is operated by a cam 63 which is composed of two halves clamped on to standard 36 by bolts 64; and has a cam surface which comes in contact with roller 65 carried at the top of valve 54. The shape of the cam is such as to bring the ports 56 and 57 into and out of register, and to also bring the ports 61 and 62 into and out of register in proper timing and sequence.

Figure 1:
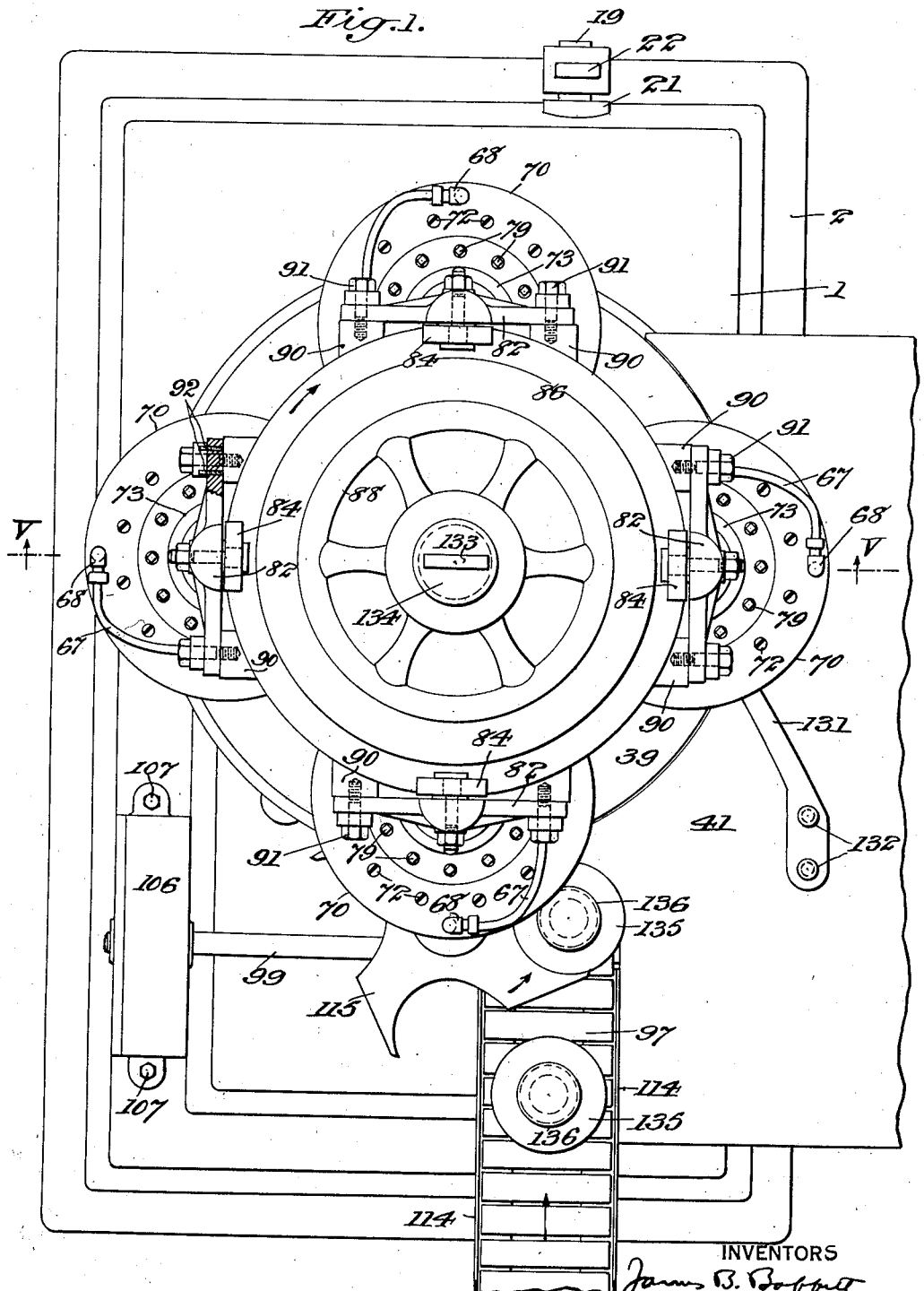
Figure 10:
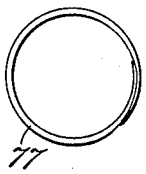
Fig. 10 represents an enlarged detail view of the drawing ring in contracted form.
Figure 11:
Fig. 11 represents a similar view of the ring in expanded form.
Figure 9:
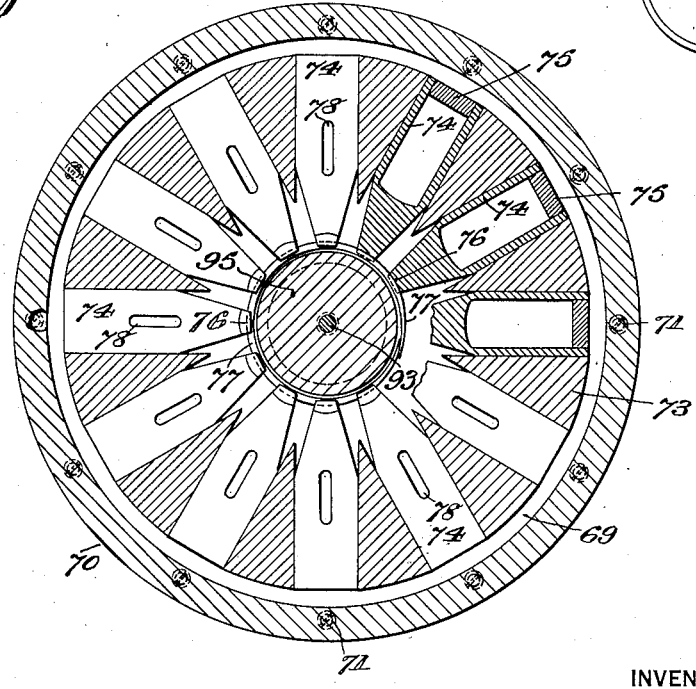
Fig. 9 represents an enlarged section taken in the plane of the line IX—IX of Fig. 5, looking in the direction of the arrows.

The nut 53 that is threaded on to tube 51 has a chamber 66 which opens into tube 54 and the said chamber communicates, by a flexible connection 67 (Fig. 1), with a nipple 68 that opens into an annular chamber 69 formed in a rim 70 which is fastened by screws 71, 72, to a chuck 73 which carries the elements that draw the caps on to the bottles. The interior detail of the chuck is well shown in Fig. 9, from which it will be seen that it is provided with a plurality of radial bores that receive hollow plungers 74 which have plugs 75 and the inner ends of which are tapered and beveled. The said plungers are made hollow in order to lighten them. The material left between the bores for the plugs constitutes sector shaped webs which connect the upper and lower parts of the chuck 73, so that complete housing and support for the plungers 74 is provided. The inner beveled extremities of the plugs have horizontal grooves 76 formed therein for the reception of a split ring 77. The said ring is composed of resilient material and is normally expanded to the size shown in Fig. 11, but it may be contracted as, for instance, to the size shown in Fig. 10. The overlapping portions of the ring are reduced in cross-section so that, when they are substantially overlapped, as in Fig. 10, the sum of their cross-sections will not differ greatly from the cross-sectional size of the remainder of the ring. Each of the plungers also has a key-way 78 formed therein for the reception of adjustable guide screws 79, whereby radial movement of the plungers in the chuck is permitted but rotary movement of the plungers on their own axes prevented.

The lower part of the chuck 73 carries a throat piece 80 which is adapted to guide the chuck and bottle into proper position when they are brought together.

A tubular slide 81 is carried in a large vertical bore in the bracket 49 and its lower end is threaded into engagement with chuck 73. The upper end has a T-head 82 mounted therein and secured by pin 83. Said T-head supports upper and lower rollers 84, 85, that embrace the peripheral edge of cam 86 which is secured on standard 36 by a key 87. This permits the cam to be vertically adjusted on the standard, and locking wheels 88, 89, which are threaded on the standard 36, suffice for fixing the cam 86 in any desired adjustment on the standard.

Figure 2:
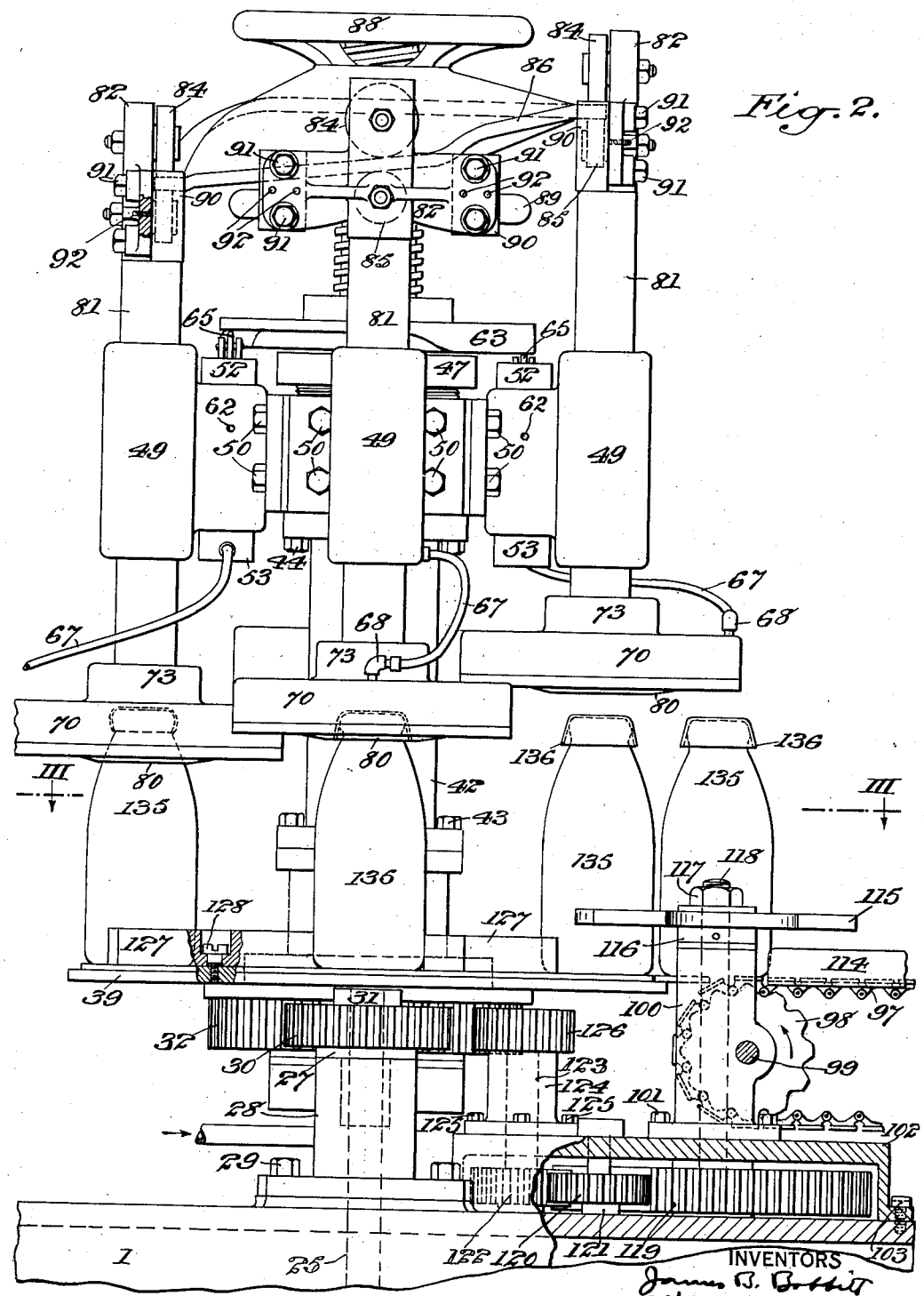
Fig. 2 represents a side elevation of the machine, partly in section and partly broken away.

In order to prevent turning movement of slide 81 in bracket 49, the T-head 82 (see Figs. 1 and 2) carries a pair of shoes 90 which are secured to the T-head by screws 91, and have curved slanting faces arranged for engagement with the circumference of cam 86. Set screws 92 which are threaded in cross-head 82 and abut shoes 90 provide for adjusting the latter as may be required.

A plunger 93 is slidably mounted in the chuck 73 and is backed by an expansion coil spring 94 that is housed in slide 81 so as normally to urge plunger 93 downwardly. A suitably shaped presser foot 95 is threaded on to the lower end of plunger 93 and adapted for engagement with the top of the bottle and cap resting thereupon.

The lower part of standard 36 has a port 96 from which piping leads to a suitable source of air pressure, or the like, not shown, in order to provide pressure for pneumatically actuating certain parts hereinabove mentioned, as will later be described.

The machine also includes means for feeding the bottles thereto, and this means comprises an endless chain 97 (Fig. 2) which surrounds a sprocket wheel 98 that is fixed on a shaft 99 mounted in a journal formed on a bearing sleeve 100 which is secured by screws 101 to a gear casing 102 that is fixed by screws 103 to the top of housing 1. One extremity of shaft 99 (see Fig. 7) is mounted in a bearing 104 carried by an upright 105 set on the top of housing 1, and the other extremity of shaft 99 has a bearing in a gear cover 106 that is fixed by screws 107 to the top of housing 1. The last named extremity of shaft 99 carries a gear 108 that meshes with gear 109 which is fixed on shaft 110 mounted in gear cover 106. The said shaft 110 has a sprocket 111 (Fig. 6) fast thereon, which is embraced by chain 112 that also embraces sprocket 113 that is fixed on shaft 7. The drive mechanism just described provides means for actuating the endless chain 97 so as to bring the bottles placed thereon in sequence to the capping machine, and it may be remarked that the endless chain has side guards 114 to keep the bottles in position thereon.

The endless chain serves only to feed the bottles to the machine, and mechanism is included for transferring the bottles from the chain to the rotating bottle support 39. This mechanism includes a recessed wheel 115 (Figs. 2 and 3) that is held between a collar 116 and a nut 117, the former of which is pinned to while the latter is threaded on a shaft 118 that has a bearing fit in sleeve 100. The shaft 118 has a large gear 119 fixed to the lower end thereof which meshes with a small gear 120 that is carried on a shaft 121 mounted in gear casing 102. Gear 120 meshes with another gear 122 that is fast on a shaft 123 which has a bearing fit in sleeve 124 secured to the top of casing 102 by screws 125. The upper end of shaft 123 has a gear 126 fast thereon and it, in turn, meshes with ring gear 32 that is secured to hub 34 on standard 36.

The recessed wheel 115 overlaps the top of chain 114, and its recesses are of such size and shape as conveniently to embrace the bottles and transfer them from the chain to the support 39 as the wheel 115 is rotated. See, in this connection, Fig. 3, from which figure, with the arrows thereon, it will also be apparent that the direction of rotation of wheel 115 and bottle support 39 is such that the bottles are transferred from the chain to the support with a movement running generally in the same direction as the adjacent portion of the support.

Figure 3:
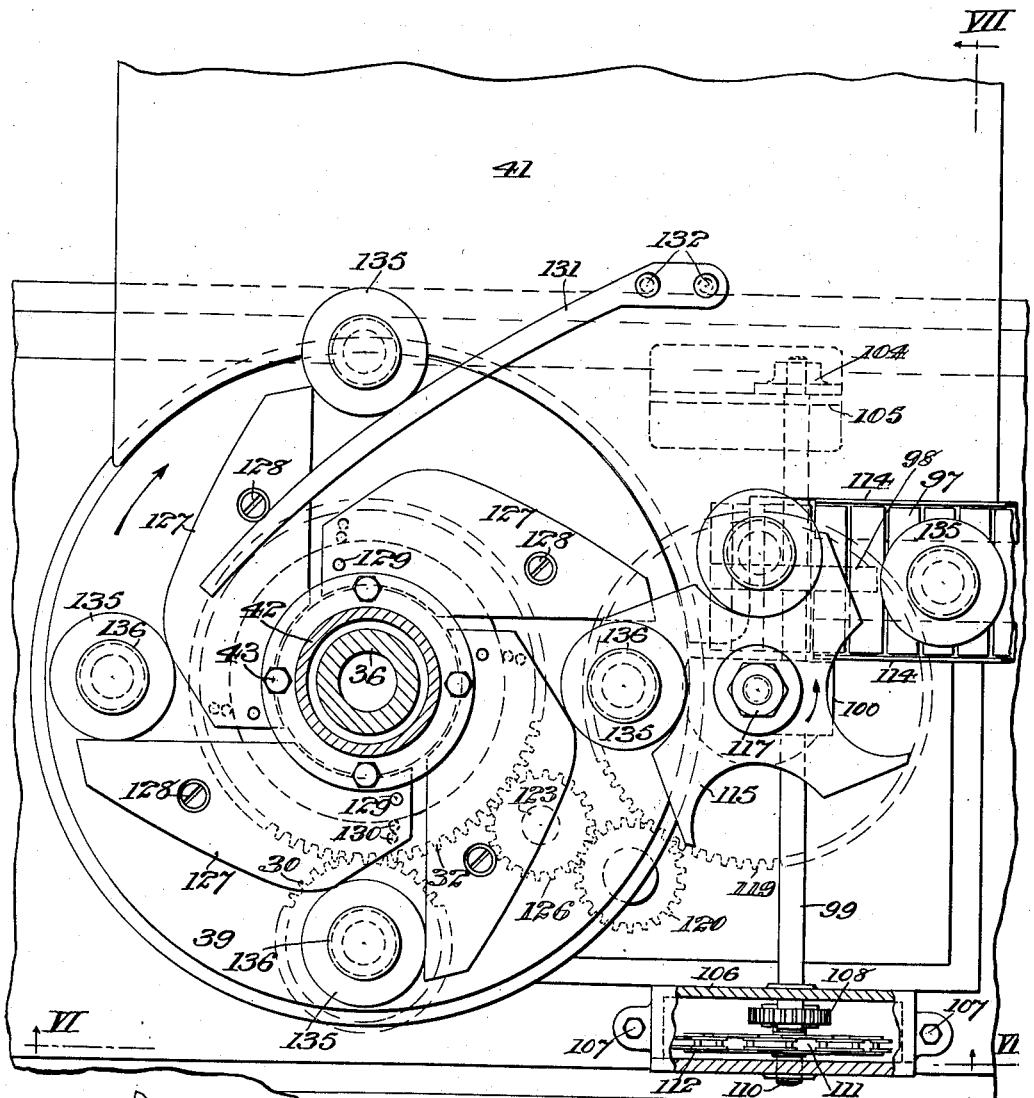
Fig. 3 represents a section taken in the plane of the line III—III of Fig. 2, looking in the direction of the arrows.
Figure 4:
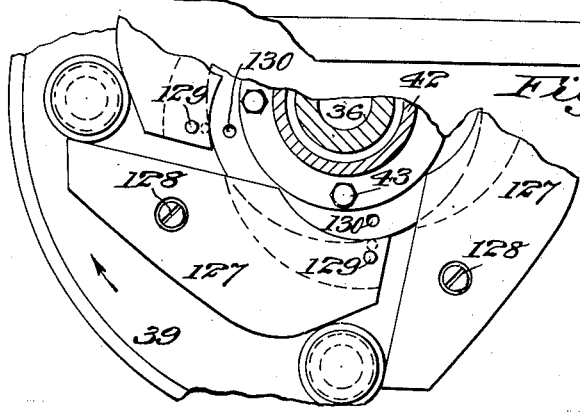
Fig. 4 represents a detail view, taken in the same plane, with certain parts shown in different positions for accommodating different sized bottles.

The machine also embodies means for holding the bottles in position on the rotating support, and this means consists of four grippers 127 (Fig. 3) that are pivoted by screws 128 to the top of support 39. The inner extremities of the grippers carry pins 129 that are fitted to be received in sockets 130 formed in the top of hub 34 and in the top of support 39. It will be observed that three of these holes are shown, and they are so located as to adapt the grippers for holding quart, pint, and half-pint sizes of milk bottles. In Fig. 3 the adjustment is shown for quart size and in Fig. 4 the parts are arranged for half-pint size. It will be seen from these views that the grippers 127 are so formed that a V-shaped notch is provided between each adjacent pair, in which a bottle will closely be received irrespective of any slight variation in size.

In order to remove the capped bottles from rotating support 39, a stripper arm 131 is fixed to receiving table 41 by screws 132 and projects over support 39 and grippers 127 in the path of travel of the bottles. The said arm 131 is slightly curved and so arranged that, in conjunction with the movement of the support and grippers, the bottles, after they have been capped, will be slid from the support on to the receiving table, for removal and shipment.

A suitable gauge 133 (Fig. 5) may be set in a plug 134 that is threaded into the top of standard 36, for the purpose of reading the state of fluid pressure.

In operation, the bottles, which are denoted by 135, with the cup shaped caps 136 loosely set thereon, are placed on chain 97 to be fed to the machine. As each bottle reaches wheel 115, it is transferred by the rotation of the latter to support 39 and held thereon by grippers 127. The rotation of support 39 brings each bottle under one of the chucks 73, which latter is then depressed by cam 86 so that the presser foot 95 on plunger 93 engages the top of the cap and bottle as indicated at the left in Fig. 5. The movement of roller 65 against the lower surface of cam 63 then brings slide valve 54 into such position that the ports 56 and 57 coincide while the ports 61 and 62 do not coincide. This permits air pressure to pass from the source of supply upwardly through hollow standard 36, through duct 60, through groove 59, through passage 58, through ports 57 and 56, through tube 51, through chamber 66, and through flexible connection 67, into chamber 69 which surrounds the outer ends of plungers 74. This air pressure then forces all the said plungers radially inwardly until split ring 77, which they carry, impinges against the outside of the cap at the top of the bottle just below the periphery of presser foot 95. The continued downward movement of the chuck 73, under influence of cam 86, combined with the radial inward pressure of plungers 74 draws the skirt of the cap into close, tight and smooth engagement with the neck or beading at the top of the bottle, as indicated at the right in Fig. 5. At the time this operation is completed, cam 63 permits slide valve 54 to rise under the action of spring 55, thereby closing communication between ports 56 and 57 and opening communication between ports 61 and 62 that permits the pressure behind plungers 74 to exhaust to atmosphere, whereupon the elasticity of ring 77 causes it to expand and move the plungers radially outwardly so as to disengage the ring 77 from the cap on the bottle. At this time the cam 86 has reached such position as to elevate chuck 73 and parts carried thereby, so that it is in position to operate upon the succeeding bottle.

As previously mentioned, the machine includes four sets of capping mechanism, including chucks, and they are all identical and work in turn upon the oncoming bottles and caps.

After the cap has been drawn on to the bottle, as above described, the latter is removed from the support 39 by stripper arm 131, until it rests upon receiving table 41, from which it may be taken by operatives or in any other suitable way.

The cap 136 is preferably composed of thin sheet metal, such as aluminum, and the result of the operation of the machine is to draw it and apply it so closely and tightly to the bottle that it must be torn to be removed therefrom, which fact tends to prevent counterfeiting and adulteration of the contents of the bottles.

It should also be noted that no whirling or rapid movement of the bottles is required for performing the operation, and this tends to eliminate any injurious effect upon the contents. Again, as the ring 77 is circular and continuous, the cap is equally acted upon at all points so as to apply it, not only snugly, but smoothly and with a sightly appearance; wrinkles or folds, and the like, being avoided.

It will be understood that various changes may be resorted to in the form, construction and arrangement of the several parts, without departing from the spirit and scope of the invention; hence, we do not intend to be limited to the details herein shown and described except as they may be included in the claims.

What we claim is:

1. In a machine of the character described, means for drawing a cap on to a bottle, and fluid actuated means for urging the drawing means radially inward, said drawing means being mechanically actuated in the reverse direction.

2. In a machine of the character described, radially disposed elements for drawing a cap on to a bottle, and a single device spanning the adjacent operative ends of all said elements and designed for immediate contact with the cap.

3. In a machine of the character described, radially disposed elements for drawing a cap on to a bottle, a resilient device spanning the adjacent operative ends of said elements and designed for immediate contact with the cap, and fluid means for actuating the said elements against the resiliency of said device.

4. In a machine of the character described, a chuck, movable elements radially disposed therein, a split ring carried by the inner ends of said elements, means for moving said elements radially inwardly, and means for moving the chuck axially, whereby a cap may be drawn on to a bottle as a result of said radial and axial movements.

5. In a machine of the character described, a chuck having a substantially circular interior, elements located in said chuck in radial disposition and adapted for radial movement therein, a chamber in said chuck surrounding the outer ends of said elements, means for admitting fluid pressure to and exhausting it from said chamber, and a resilient device carried by the inner ends of said elements.

6. In a machine of the character described, a chuck having a substantially circular interior, elements located in said chuck in radial disposition and adapted for radial movement therein, a chamber in said chuck surrounding the outer ends of said elements, means for admitting fluid pressure to and exhausting it from said chamber, and a resilient circular device carried by the inner ends of said elements.

7. In a machine of the character described, a chuck having a substantially circular interior, elements located in said chuck in radial disposition and adapted for radial movement therein, a chamber in said chuck surrounding the outer ends of said elements, means for admitting fluid pressure to and exhausting it from said chamber, and a split ring carried by the inner ends of said elements.

8. In a machine of the character described, a chuck having a substantially circular interior, elements located in said chuck in radial disposition and adapted for radial movement therein, a chamber in said chuck surrounding the outer ends of said elements, means for admitting fluid pressure to and exhausting it from said chamber, and a resilient split ring carried by the inner ends of said elements.

9. A machine of the character described comprising, a rotatable support for bottles, a plurality of capping chucks, means for depressing and elevating the chucks to move them into and out of operative position, fluid actuated elements radially disposed within said chucks for drawing caps on to bottles, and means for timing the operation of the parts so that the fluid means will be operative to urge said elements radially inward during the depressing movement of the chucks and inoperative during the elevating movement thereof.

10. A machine of the character described comprising, a standard, a rotatable support for bottles carried by said standard, a plurality of capping chucks carried by said standard in spaced relation therefrom and arranged to rotate therearound, means carried by said standard for depressing and elevating the chucks to move them into and out of operative position, fluid actuated elements carried by said chucks for drawing caps on to bottles, and means intermediate the standard and the chucks for regulating the flow of fluid to and from the said elements.

11. In a machine of the character described, a chuck, a multiplicity of movable elements radially disposed therein, each said element being tapered vertically and horizontally adjacent its inner end and being provided with a horizontal groove at said end, and a resilient split ring carried in the horizontal grooves.

12. In a machine of the character described, means for drawing a cap on to a bottle, means for urging the drawing means radially inwardly, and means for moving the drawing means in the reverse direction, said means for urging the drawing means inwardly being fluid actuated.

In testimony, that we claim the foregoing as our invention, we have signed our names this 22d day of December, 1928.

JAMES B. BABBITT.
CLIFFORD B. HARRIS.